(12) United States Patent
Rynders et al.

(10) Patent No.: US 6,302,402 B1
(45) Date of Patent: Oct. 16, 2001

(54) COMPLIANT HIGH TEMPERATURE SEALS FOR DISSIMILAR MATERIALS

(75) Inventors: Steven Walton Rynders, Fogelsville; Eric Minford, Laurys Station; Richard Ernest Tressler, Boalsburg, all of PA (US); Dale M. Taylor, Salt Lake City, UT (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/349,039

(22) Filed: Jul. 7, 1999

(51) Int. Cl.$^7$ ...................................................... F16J 15/08

(52) U.S. Cl. .......................... 277/530; 277/541; 277/653

(58) Field of Search .................................... 277/438, 439, 277/440, 442, 451, 529, 530, 534, 541, 602, 642, 647, 652, 653

(56) References Cited

U.S. PATENT DOCUMENTS

| | | | |
|---|---|---|---|
| 2,862,775 | * 12/1958 | Kupiec | 277/438 X |
| 3,047,300 | * 7/1962 | Taylor et al. | 277/530 |
| 3,163,431 | * 12/1964 | Tanner | 277/530 X |
| 3,183,008 | * 5/1965 | Yost | 277/438 |
| 3,594,012 | 7/1971 | Whittaker et al. . | |
| 3,653,672 | 4/1972 | Felt . | |
| 3,892,418 | 7/1975 | Felt . | |
| 3,915,462 | * 10/1975 | Bruns et al. | 277/647 |
| 4,309,738 | 1/1982 | Mulkins et al. . | |
| 4,540,184 | * 9/1985 | Takahashi et al. . | |
| 4,553,761 | 11/1985 | Blesing et al. . | |
| 4,735,635 | 4/1988 | Israelson et al. . | |

(List continued on next page.)

FOREIGN PATENT DOCUMENTS

| | | |
|---|---|---|
| 19532090 | 3/1997 | (DE) . |
| 6364669 | 12/1998 | (JP) . |
| WO99/21649 | 5/1999 | (WO) . |

OTHER PUBLICATIONS

Beck et al, "Development of a high–temperature ceramic to metal seal", *Proc. Instn Mech Engrs*, vol. 211, Part E, pp. 109–114 (1997).

Velterop et al, "Development of a High Temperature Resistant Module for Ceramic Membranes", *Key Engineering Materials*, vol. 61 and 62, pp. 391–394 (1991).

Saracco et al, "Catalytic Inorganic–Membrane Reactors: Present Experience and Future Opportunities", *Catal. Rev., Sci. Eng.*, 36(2), 305–384, at pp. 366–368 (1994).

Brink et al, Handbook of Fluid Sealing, pp. 6.7–6.9 (1993).

"Seals for Extreme Environments", Advanced Products Reference Guide (1996).

"New Leak–Proof C–Ring Structure", (28838) Disclosure Anonymously in *Research Disclosure*, Apr. 1988.

Primary Examiner—Robert J. Sandy
Assistant Examiner—Karlena D. Schwing
(74) Attorney, Agent, or Firm—John M. Fernbacher

(57) ABSTRACT

A high temperature, gas-tight seal is formed by utilizing one or more compliant metallic toroidal ring sealing elements, where the applied pressure serves to activate the seal, thus improving the quality of the seal. The compliant nature of the sealing element compensates for differences in thermal expansion between the materials to be sealed, and is particularly useful in sealing a metallic member and a ceramic tube art elevated temperatures. The performance of the seal may be improved by coating the sealing element with a soft or flowable coating such as silver or gold and/or by backing the sealing element with a bed of fine powder. The material of the sealing element is chosen such that the element responds to stress elastically, even at elevated temperatures, permitting the seal to operate through multiple thermal cycles.

30 Claims, 5 Drawing Sheets

U.S. PATENT DOCUMENTS

| | | |
|---|---|---|
| 5,031,923 | 7/1991 | Davies . |
| 5,092,610 | 3/1992 | Dunham et al. . |
| 5,139,191 | 8/1992 | Velterop . |
| 5,139,274 | 8/1992 | Oseman . |
| 5,358,262 | 10/1994 | Roberts . |
| 5,401,406 | 3/1995 | Johnson et al. . |
| 5,591,515 | 1/1997 | Mazanec et al. . |
| 5,599,383 | 2/1997 | Dyer et al. . |
| 5,639,437 | 6/1997 | Balachandran et al. . |
| 5,681,373 | 10/1997 | Taylor et al. . |
| 5,712,220 | 1/1998 | Carolan et al. . |
| 5,723,074 | 3/1998 | Balachandran . |
| 5,725,218 | 3/1998 | Maiya et al. . |
| 5,795,454 | 8/1998 | Friese et al. . |
| 5,817,597 | 10/1998 | Carolan et al. . |
| 5,820,654 | 10/1998 | Gottzman et al. . |
| 5,820,655 | 10/1998 | Gottzmann et al. . |

* cited by examiner

COMPLIANT HIGH TEMPERATURE SEALS FOR DISSIMILAR MATERIALS

CROSS-REFERENCE TO RELATED APPLICATIONS

Not applicable.

STATEMENT REGARDING FEDERALLY SPONSORED RESEARCH OR DEVELOPMENT

This invention was made with government support under Contract No. DE-FC26-98FT40343 between Air Products and Chemicals, Inc. and the U.S. Department of Energy. The Government has certain rights to this invention.

BACKGROUND OF THE INVENTION

Ceramic-to-metal seals are required in certain processes which operate at high temperatures and which may operate in chemically active environments. Such seals are required in high temperature ceramic heat exchangers, fuel cells, gas sensors, hot gas filters, and ceramic membrane reactors producing oxygen or synthesis gas. A common problem in the design and operation of such seals is that ceramics and metals usually have different coefficients of thermal expansion, which can cause seal failures due to mechanical stresses in the seals during heating and cooling.

One type of seal for joining ceramics and metals utilizes selected mixtures or combinations of ceramics, glasses, or metal brazing compositions to form a graduated seal fused to the ceramic and metal elements to be joined. One method for joining ceramic materials having dissimilar coefficients of thermal expansion is the graded glass seal. This type of seal is used to join a low expansion glass such as Pyrex™ or fused silica to a relatively higher expansion ceramic such as alumina or mullite. The seal is formed by forming several layers of glasses with coefficients of thermal expansion intermediate the two end members such that the coefficient of thermal expansion of the seal forms a gradual transition from one end member to the other. These types of seals, while gas tight, are limited to relatively low operating temperatures ($\leq \sim 600°$ C.) and pressures near ambient.

An alternative approach has been the use of soft metal brazes such as alloys of silver and gold. This type of seal can accommodate small differences in coefficients of thermal expansion; however, it is limited in operating temperature and pressure by the melting point of the alloys and the high temperature deformation resistance of the alloys. Thermal cycling of this type of seal can result in cracking of the ceramic if the coefficient of thermal expansion of the ceramic is significantly different than that of the alloy.

Seals of the types described above can be used in reactors utilizing mixed conductor metal oxide ceramic membranes which conduct oxygen ions. Representative or illustrative examples of this application for fused seals are given in U.S. Pat. Nos. 5,599,383, 5,561,373, 5,712,220, and 5,725,218.

Alternatively, metal and ceramic elements can be sealed by mechanical sealing devices which contact, but are not fused to, the metal and ceramic materials to be sealed. Such sealing devices may allow some movement between the metal and ceramic members, thereby relieving stresses caused by different degrees of expansion during heating and cooling.

U.S. Pat. No. 5,358,262 describes a multi-layer seal element for use between metal and ceramic components at high temperatures. The element is composite of elongated ceramic fibers, braided metal mesh, and braided ceramic fiber, and the composite element can be formed into an O-ring for use in a flanged seal.

A seal for a ceramic gas sensor element is disclosed in U.S. Pat. No. 5,795,454 in which the sensor is held in a longitudinal metal bore by a stack of compressed sintered ceramic sealing bodies. A similar seal is disclosed in German Patent Publication DE 195 32 090 A1.

U.S. Pat. No. 5,401,406 describes a seal device for sealing a high temperature ceramic filter element into a metal housing wherein a ceramic fiber gasket material is compressed between metallic and ceramic elements which have different coefficients of thermal expansion. Another type of high temperature ceramic filter is disclosed in U.S. Pat. No. 4,735,635 in which tubular ceramic filter elements, each having an enlarged shoulder on the open end, are inserted into a metal tube sheet having holes smaller than the tube shoulders. High temperature gasket material is placed between each tube shoulder and the tube sheet, and the gasket is compressed in place by exerting compressive force on the ends of the ceramic tubes.

A high temperature ceramic-to-metal seal for a ceramic heat exchanger is disclosed in an article entitled "Development of a High-Temperature Ceramic to Metal Seal" by S. B. M. Beck et al in *Proc Instn Mech Engrs* Vol 211 Part E, pp. 109–114. The seal utilizes a stuffing box with a woven alumina rope packing material which is compressed in place by a screw attachment which urges the packing material against the metal and ceramic parts to be sealed.

Ceramic-to-metal seals for solid electrolyte ionic conductor reactors are described generically by U.S. Pat. Nos. 5,820,654 and 5,820,655 in which seals are provided at less than 300° C. by welding or brazing between ceramic and metal members. It is stated that O-rings, bellows, or other mechanical means can be used. It is disclosed that ceramic tubes can be sealed into tube sheets by sliding O-ring seals of unspecified material and design.

Metal and ceramic components can be sealed by means of flexible metal bellows which are welded or brazed in place as disclosed in articles entitled "Catalytic Inorganic Membrane Reactors: Present Experience and Future Opportunities" by G. Saracco et al in *Catal. Rev., Sci. Eng.*, 36(2), 305–384, at pp. 366–368 and "Development of a High Temperature Resistant Module for Ceramic Membranes" by F. M. Velterop et al in *Key Engineering Materials*, Vols. 61 and 62 (1991), pp. 391–394.

The design and operation of high temperature mixed conductor membrane reactor systems for the production of oxygen, synthesis gas, and other hydrocarbon products will utilize tubular geometry within the reactor modules and for piping connections to the reactor modules for feed and product gas flow. Ceramic-to-metal seals are required in these reactor systems to segregate feed and product gases at elevated process temperatures in the range of 500° C. to 1000° C. Such seals must be able to cycle between ambient temperature and operating temperature while segregating gases with elevated pressure differentials across the seals. The invention disclosed below and defined by the claims which follow provides compliant mechanical seals for such high-temperature applications, in particular for use in the operation of ceramic membrane reactor systems.

BRIEF SUMMARY OF THE INVENTION

The invention is a seal element which comprises a metallic toroidal ring having an axial cross section which defines a planar figure, wherein the planar figure partially encloses an area having an open side and a closed side, and wherein the toroidal ring has a ring width and a metal thickness such that the ratio of the ring width to the metal thickness is greater than about 15. The toroidal ring comprises a metallic material which can be coated at least in part with a metallic coating. The metallic material can comprise one or more elements selected from the group consisting of iron, nickel, chromium, tungsten, molybdenum, and cobalt. The metallic coating can comprise one or more elements selected from the group consisting of gold, copper, nickel, palladium, and platinum.

The toroidal ring typically comprises inner and outer members which partially enclose a circumferential volume having an open side and a closed side, wherein the open side is oriented in a generally axial direction relative to the toroidal ring. The open side of the planar figure can be oriented in a generally axial direction relative to the toroidal ring.

The invention includes a seal assembly comprising:

(a) a metallic member having a cylindrical opening formed therein;

(b) a ceramic tube located coaxially within the cylindrical opening and forming an annulus between the metallic member and the ceramic tube; and (c) a seal located in the annulus and in contact with the metallic member and the ceramic tube, wherein the seal comprises a toroidal ring having an axial cross section which defines a planar figure, wherein the planar figure partially encloses an area having an open side and a closed side, and wherein the toroidal ring comprises a metallic material.

The metallic material of the toroidal ring can comprise one or more elements selected from the group consisting of iron, nickel, chromium, tungsten, molybdenum, and cobalt. The metallic material of the toroidal ring can be coated at least in part with a metallic coating which comprises one or more elements selected from the group consisting of silver, gold, copper, nickel, palladium, and platinum. The toroidal ring typically has a ring width and a metal thickness such that the ratio of the ring width to the metal thickness is greater than about 15. The open side of the planar figure preferably is oriented in a generally axial direction relative to the toroidal ring, although this is not an absolute requirement.

The invention includes a method for sealing a metallic member and a ceramic member which comprises:

(a) providing an annulus between the metallic member and a cylindrical ceramic member;

(b) placing a seal in the annulus wherein the seal comprises a metallic toroidal ring having an axial cross section which defines a planar figure, wherein
the planar figure partially encloses an area having an open side and a closed side,
the toroidal ring comprises inner and outer members which partially enclose a circumferential volume having an open side and a closed side; and (c) maintaining a first gas at a first pressure in an annular volume defined by a first portion of the annulus and the open side of the circumferential volume of the toroidal ring.

The open side of the planar figure preferably is oriented in a generally axial direction relative to the toroidal ring, although this is not an absolute requirement. The open side and the closed side of the circumferential volume typically are oriented in generally opposite axial directions relative to the toroidal ring. The toroidal ring can be coated at least in part with a metallic coating.

The method for sealing a metallic member and a ceramic member can further comprise maintaining gas at a second pressure in an annular volume defined by a second portion of the annulus and the closed side of the circumferential volume of the toroidal ring, wherein the second pressure is less than the first pressure, and wherein the differential pressure between the first gas and the second gas urges the inner and outer members of the toroidal ring against the cylindrical ceramic member and the metallic member respectively to effect a pressure-activated seal. The first gas can be an oxygen-containing gas and the second gas can be an oxygen-containing gas having a higher oxygen concentration than the first gas. Alternatively, the first gas can comprise one or more components selected from the group consisting of methane, hydrogen, carbon monoxide, and carbon dioxide, and the second gas is an oxygen-containing gas.

The metallic toroidal ring can comprise one or more elements selected from the group consisting of iron, nickel, chromium, tungsten, molybdenum, and cobalt. The metallic coating can comprise one or more elements selected from the group consisting of silver, gold, copper, nickel, palladium, and platinum.

The planar figure formed by the axial cross section can be described by a general shape selected from the group consisting of C, H, S, U, V, W, X, and Y. Optionally, the closed lower side of the circumferential volume of the toroidal ring can be supported by a contiguous material contained in the annulus, wherein the contiguous material is a powder, a fiber, or a mixture of a powder and a fiber.

In a preferred embodiment, the planar figure formed by the axial cross section of the toroidal ring is U-shaped, thereby forming a U-shaped toroidal ring having an open side and a closed side. The toroidal ring typically has a ring width and a metal thickness such that the ratio of the ring width to the metal thickness is greater than about 15. In this preferred embodiment, the closed lower side of the circumferential volume of the toroidal ring can be supported by a contiguous material contained in the annulus, wherein the contiguous material is a powder, a fiber, or a mixture of a powder and a fiber. Optionally, the seal can further comprise an additional U-shaped toroidal ring, wherein the additional U-shaped toroidal ring comprises a metallic material coated at least in part with a metallic coating. The U-shaped toroidal ring and the additional U-shaped toroidal ring can be situated adjacently in the annulus, wherein the open side of each U-shaped toroidal ring is oriented in the same axial direction. A spacer can be placed between the closed side of the U-shaped toroidal ring and the open side of the additional U-shaped toroidal ring.

The metallic member can have a cylindrical opening therein and the cylindrical ceramic member can comprise a ceramic tube, wherein the annulus is defined by placement of the ceramic tube coaxially within the cylindrical opening in the metallic member. The metallic member can comprise one or more elements selected from the group consisting of iron, nickel, chromium, tungsten, molybdenum, and cobalt. The metallic member, the cylindrical ceramic member, and the toroidal ring typically are maintained at temperatures between about 400° C. and about 1000° C.

DETAILED DESCRIPTION OF THE INVENTION

Figure 1:
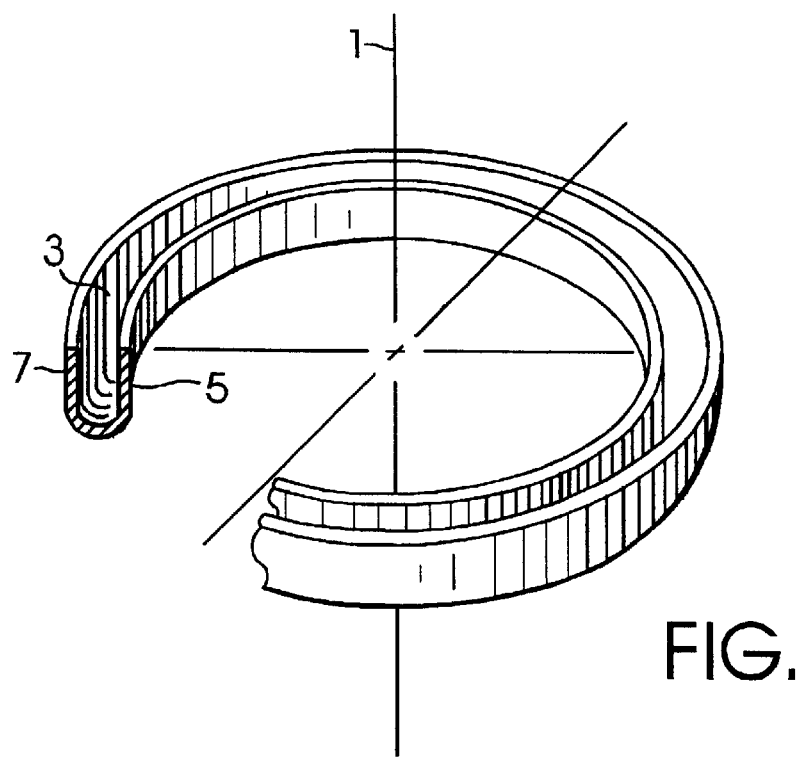
FIG. 1 is a section in perspective of a sealing element of the present invention.

The present invention embraces high temperature seals which utilize one or more compliant metallic sealing rings or sealing elements in which the applied differential pressure across the seal serves to activate the seal and promote acceptable sealing at elevated process pressures. The compliant nature of the sealing element allows for differences in thermal expansion between the materials to be sealed. The performance of the sealing element may be improved by coating the metallic sealing element with a soft or flowable metal coating such as silver or gold and/or by backing the sealing element with a bed of fine powder. The metallic material of the sealing element is chosen such that the element responds to stress elastically, even at elevated temperatures, permitting the seal to perform proper sealing and gas segregation through multiple thermal and/or pressure cycles. A characteristic of the sealing ring is that the metal used to form the ring is thin relative to the width of the ring, which imparts a high degree of compliance or flexibility to the active parts of the ring.

A seal is defined herein as a device for segregating two fluids which are typically at different pressures in adjacent regions of an apparatus or process system, wherein the purpose of the seal is to minimize the leakage of fluid from a higher pressure region to an adjacent lower pressure region. Absolute leak-tight seals are difficult or impossible to achieve in many practical applications. The objective in seal design and operation of the present invention is to limit leakage to an acceptable level which does not adversely affect the operation of the process which utilizes the seal. Process economics, product purity, system stability, and safety all must be considered in assessing leak impact and seal design.

Each sealing element of the present invention is fabricated in the shape of a toroidal ring, which is defined herein as the body formed by the rotation of a planar figure about a line or axis of rotation which lies in the same plane as the planar figure but does not intersect it. The axis of rotation is the axis of the toroidal ring. The axial cross section of a toroidal ring therefore is defined by the intersection of the ring with a plane, wherein the axis of the toroidal ring lies entirely in the plane. As an illustration, the rotation of a disc about an axis of rotation which lies in the same plane as the disc forms a toroidal ring typically known as an O-ring, and the axial cross section of the O-ring forms a disc.

Each sealing element has an axial cross section forming any planar shape or figure which defines an area having an open side and a closed side. The open side of the figure formed by the cross section is oriented in a generally axial direction relative to the toroidal ring, and the closed side is oriented in a generally opposite direction from the open side. Likewise, the toroidal ring defines a general circumferential volume enclosed or defined by an open side and a closed side. Typically the open side of the toroidal ring is oriented in a generally axial direction and the closed side is oriented in a generally opposite axial direction from the open side. The circumferential volume typically is oriented in a generally axial direction.

The term "open side" used in describing the toroidal ring cross section means that portion of the seal cross section which is in direct communication or contact with the fluid on the higher pressure side of the seal. The open side is usually oriented in a generally axial direction, but in some embodiments could be oriented in a generally radial direction. The term "closed side" means that portion of the seal cross section which is in direct communication or contact with the fluid on the lower pressure side of the seal. Similarly, the term "open side" used in describing the circumferential volume enclosed by the toroidal ring means that portion of the seal body which is in direct communication or contact with the fluid on the higher pressure side of the seal. The term "closed side" means that portion of the seal on the side opposite the open side, wherein the closed side is in direct communication or contact with the fluid on the lower pressure side of the seal. The term "inner" refers to a point closer to the axis of the ring and the term "outer" refers to a point farther from the axis of the ring. The inner direction is the radial direction towards the axis and the outer direction is the radial direction away from the axis.

As described in more detail below, the toroidal ring sealing element can have any shape with an open side which allows the higher pressure fluid to expand or urge portions of the ring against both the inner member and the outer member of an annular seal assembly. The toroidal ring sealing element therefore is defined as a pressure-activated seal.

As an example, one of the preferred sealing elements of the invention has an axial cross section defining a U-shaped body in which the open end of the U is oriented in the axial direction and the closed end of the U is oriented in the opposite axial direction. When used in a seal assembly as described below, the open side of the U is in contact with the higher pressure fluid and the closed side of the U is in contact with the lower pressure fluid. The toroidal ring defined by the rotation of the U-shaped body about the axis is illustrated in FIG. 1, which shows the ring having axis 1 and circumferential volume or groove 3 defined by inner member 5 and outer member 7. The ring of FIG. 1 is not necessarily drawn to scale, but is meant to illustrate the general characteristics of the ring. The open end of the circumferential volume or groove 3 is oriented in the same direction as axis 1, i.e. is oriented axially.

The dimensions of the ring are defined as follows. The ring width is defined as the radial distance between the innermost and the outermost portions of the ring. For example, referring to FIG. 1, the ring width is the radial distance between the inner surface of inner member 5 and the outer surface of outer member 7. The ring height is defined as the axial distance between the upper and lower planes defined by the highest and lowest parts of the ring defined in the axial direction. For example, referring to FIG. 1, the ring height is the axial distance between an upper plane formed by the tops of inner member 5 and outer member 7 and a lower plane tangent to the bottom outer curved surface of the U-shaped section. The outer diameter of the ring is the largest dimension of the ring in the radial direction. For example, referring to FIG. 1, the outer diameter of the ring is measured from a point on the outer surface of member 7 to the corresponding point on the opposite side 180 degrees around the ring.

The metal thickness is defined as the average thickness of the compliant arms or members of the ring. For example, referring to FIG. 1, the metal thickness is the average radial distance between the inner surface of inner member 5 and the outer surface of inner member 5. Alternatively, the metal thickness is the average radial distance between the inner surface of outer member 7 and the outer surface of outer member 7. The thickness of the compliant arms or members may not be uniform in the radial and/or axial directions, and for this reason the metal thickness is defined in terms of an average metal thickness.

Figure 2:
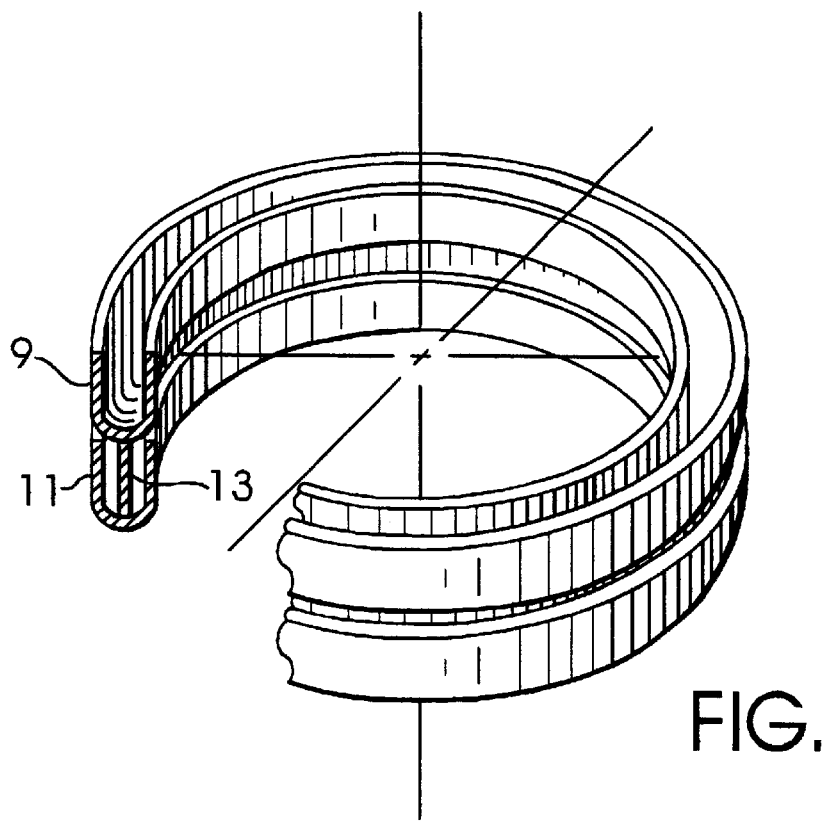
FIG. 2 is a section in perspective of an alternative sealing element of the present invention.

An alternative embodiment of the invention comprises two U-rings as shown in FIG. 2. In this embodiment, U-ring 9 is stacked above U-ring 11 and the rings are separated by spacer 13. This dual ring assembly improves sealing action by increasing the total seal contact area with inner member 5 and outer member 7. Also, the dual ring assembly enforces alignment of the sealed members, for example members 33 and 35 in FIG. 4. This axial alignment is an important factor in achieving an acceptable seal.

Other axial cross sections of the sealing element or toroidal ring are possible which form planar figures having other general shapes, some of which can be described schematically by the letters C, H, S, V, W, X, and Y as described in more detail below. Other more complex shapes can be envisioned which have similar mechanical properties. The common characteristic of these planar figures is that the toroidal ring defined by each figure has a circumferential volume which is oriented in a generally axial direction and contacts a higher pressure fluid relative to a lower pressure fluid on the closed side, and the higher pressure fluid expands or urges the compliant arms or members of the ring against both the inner member and the outer member of an annular seal assembly.

The sealing elements or toroidal rings can be made of any metallic material which has the proper mechanical performance in the desired range of operating temperatures, sufficient strength to support the pressure differential across the seal wall, and a sufficiently high yield strength at the operating temperature to ensure that it deforms, at least in part elastically, under the influence of the applied pressure. The metallic material can be a single metal or an alloy which has the required properties. An alloy is preferred, and the alloy may comprise elements selected from the group consisting of iron, nickel, chromium, tungsten, molybdenum, and cobalt. Preferred alloys include the commercially-available nickel-containing Inconel 600, Inconel 625, Incoloy 800, and Haynes 230.

The required metal thickness in a sealing element or ring will depend upon the cross-sectional shape, the ring width, the ring height, and also may depend on the pressure differential encountered in an operating seal formed by the ring. Because the ring applies mechanical pressure to the ceramic member, which is a relatively brittle material, the metal thickness is preferably small relative to the ring width or height to minimize the spring or compliant force of the ring against the ceramic. In general, the preferred ratio of the ring width to the metal thickness is greater than about 15 and may range up to about 40.

The U-rings described in FIGS. 1 and 2, for example, can have a metal thickness typically about 0.004 to about 0.006 inch, a ring width of about 0.100 to about 0.150 inch, a ring height of about 0.100 to about 0.200 inch, and a ring inner diameter of between about 0.250 and about 2.000 inch.

A sealing element or toroidal ring as described above can be utilized as fabricated, or alternatively and preferably can be coated with a softer flowable coating which will conform to minor irregularities in the surfaces of the members to be sealed. The coating can be applied to the entire ring surface or can be applied to selected portions of the ring surface which contact the surfaces of the members to be sealed. Preferably the coating is a softer metal such as silver or gold, or alloys containing silver or gold, and is plated on at least a portion of the ring surface. Other metals can be used, either alone or in alloys, such as copper, nickel, palladium, and platinum.

Figure 3:
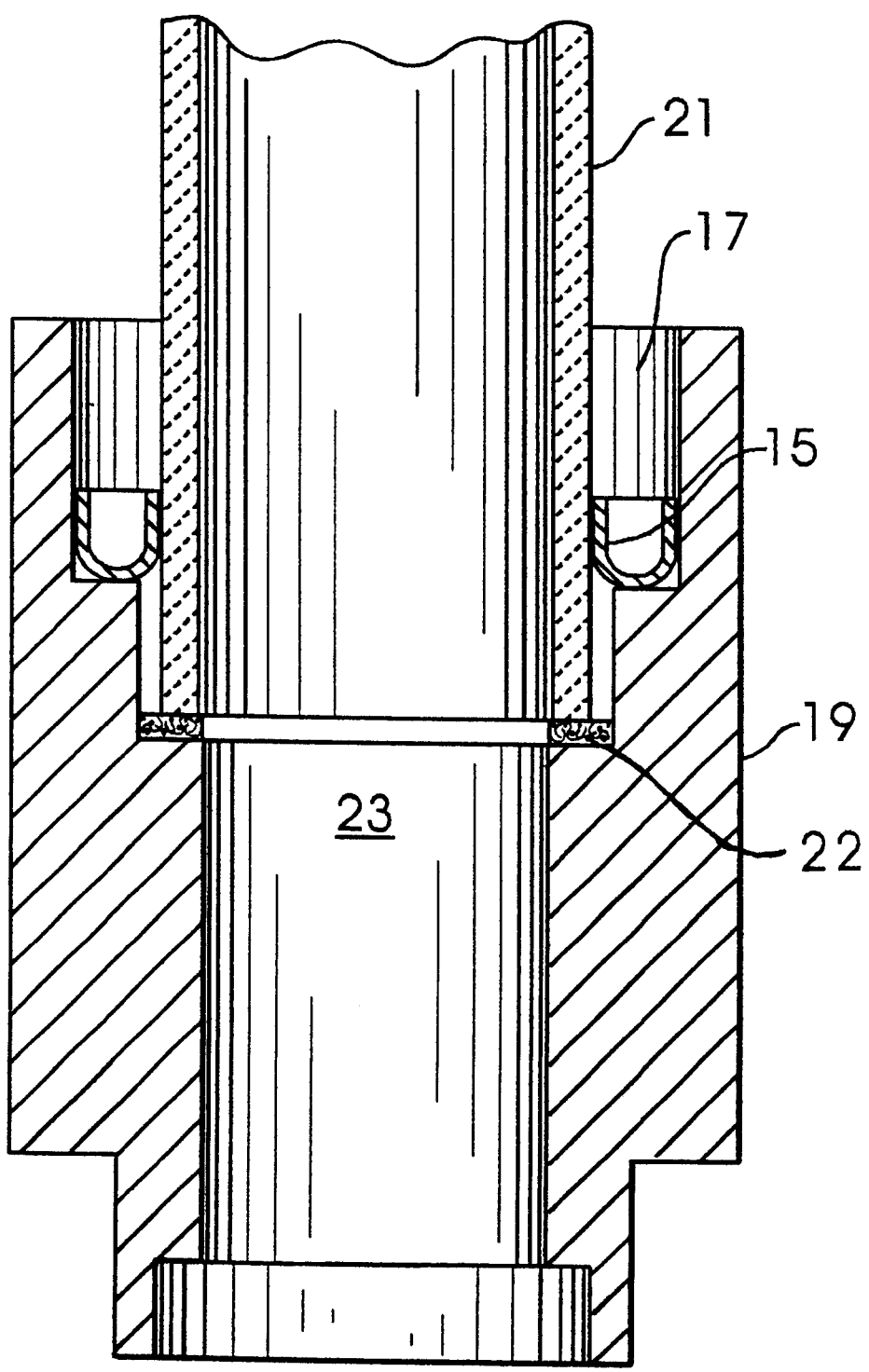
FIG. 3 is a cross section of a seal assembly using the sealing element of FIG. 1.

A seal assembly utilizing the U-shaped toroidal ring of FIG. 1 is illustrated in cross section in FIG. 3. Seal element 15 is a thin, compliant metal U-ring which is located in annulus 17 formed between a cylindrical opening in metal member 19 and the outer diameter of ceramic tube 21. Preferably the U-ring is inserted into annulus 17 in a slightly radially compressed mode, i.e. is force-fit into the annulus, so that the side arms or members of the seal after insertion spring radially outward against the inner wall of metal member 19 and the outer wall of ceramic tube 15. Cushioning ring 22, typically a ceramic felt or wool, may be utilized to prevent direct contact between metal member 19 and ceramic tube 21.

The seal assembly depicted in FIG. 3 can be used in any device in which lower pressure gas in inner bore 23 is to be segregated from higher pressure gas outside of ceramic tube 21 and metal member 19. The U-ring is oriented such that the open section of the U is toward the higher pressure side of the seal, and the differential gas pressure between inner bore 23 and the outer region of the tube assembly activates the seal by urging the side arms or members of the seal apart and against the inner and outer surfaces of annulus 17. Higher pressure differentials act to urge the side arms or members of the seal further outward, thereby improving the sealing action required at the higher pressure differentials. Because the U-ring is compliant by virtue of its small metal thickness, it can accommodate differences in the coefficient of thermal expansion between metal member 19 and ceramic tube 21 as temperatures change without transmitting undue stress to either material. Because the material from which the U-ring sealing element is formed behaves elastically, even at elevated operating temperatures, the seal can withstand changes in temperature and pressure without loss of seal integrity.

The alloy from which the sealing element or U-ring is fabricated is also important. The alloy should maintain sufficient elastic performance in the desired range of operating temperatures, have sufficient strength to support the pressure differential across a thin wall, and have a sufficiently high yield strength at the operating temperature to ensure that it deforms elastically under the influence of the applied pressure. As discussed above, the sealing element or U-ring preferably is coated, at least on its outer surfaces and if desired on the entire surface, with a relatively soft metal. This softer coating conforms to minor irregularities in the outer surface of ceramic tube 21 and the inner surface of metal member 19 which forms the outer boundary of annulus 17, thereby improving the seal performance.

A seal assembly similar to that in FIG. 3 can utilize alternative types or shapes of toroidal rings in place of the U-ring described. Any compliant, pressure-activated metallic ring, preferably coated with a relatively soft metal as described above, can be used.

Figure 4:
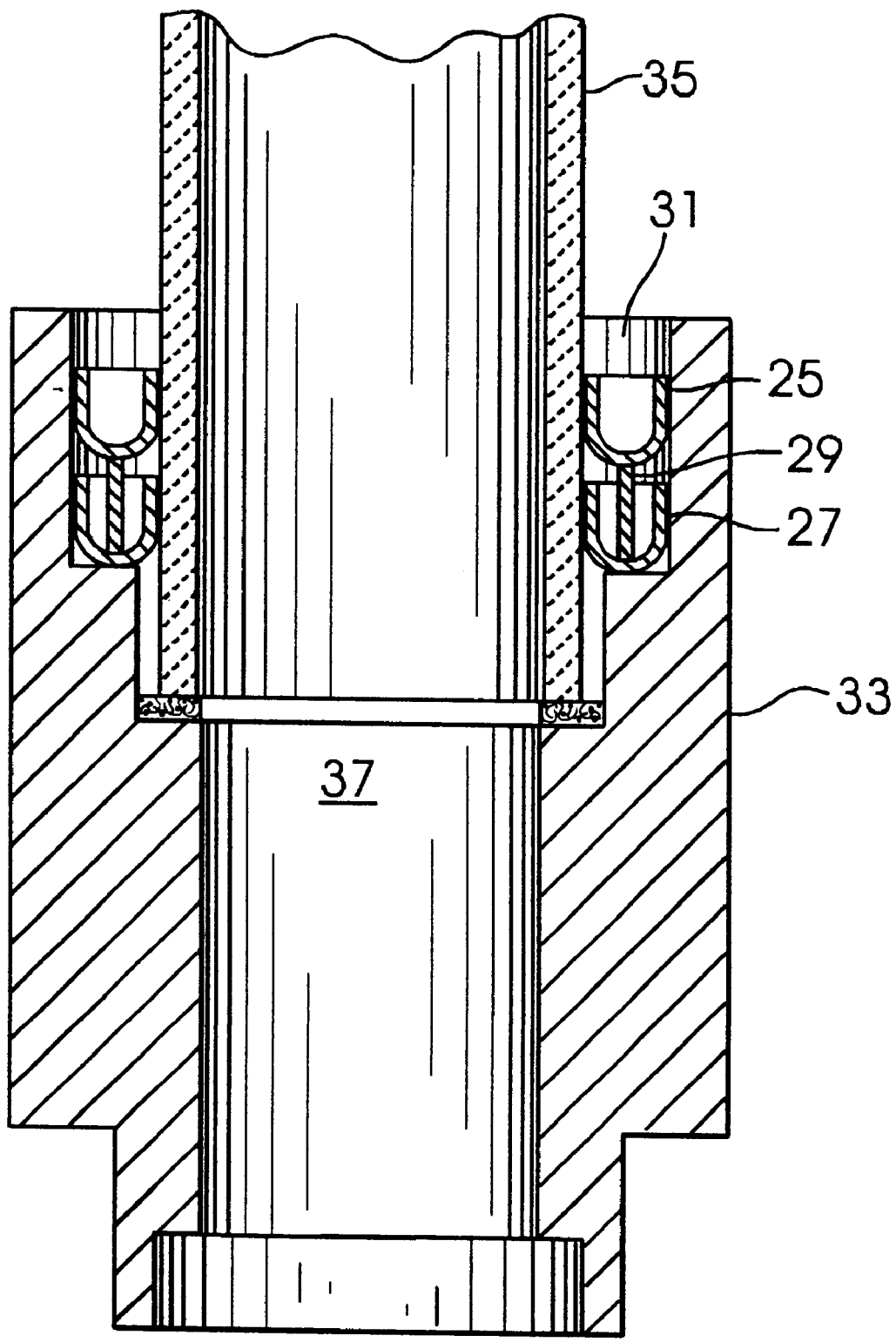
FIG. 4 is a cross section of a seal assembly using the sealing element of FIG. 2.

An alternative seal assembly utilizing the double U-shaped toroidal rings of FIG. 2 is illustrated in cross section in FIG. 4. The double U-ring assembly comprises upper U-ring 25, lower U-ring 27, and spacer 29 which is located between the U rings as shown. The double U-ring assembly is inserted into annulus 31 formed between a cylindrical opening in metal member 33 and the outer diameter of ceramic tube 35. Preferably the double U-ring assembly can be inserted into annulus 31 in a slightly radially compressed mode, i.e. force-fit into the annulus, so that the side arms or members of the seal elements after insertion are radially constrained by the inner wall of metal member 33 and the outer wall of ceramic tube 35.

The seal assembly depicted in FIG. 4 can be used in any device in which lower pressure gas in inner bore 37 is to be segregated from higher pressure gas outside of ceramic tube 35 and metal member 33. The double U-ring is oriented such that the open section of each U-ring is toward the higher pressure side of the seal, and the differential gas pressure between inner bore 37 and the outer region of the tube assembly activates the seal by urging the side walls of the seal elements apart and against the inner and outer surfaces of annulus 31. Higher pressure differentials act to urge the side walls of the seal elements further apart, thereby improving the sealing action required at the higher pressure differentials. Because each of the U-ring elements is compliant by virtue of its small thickness, it can accommodate differences in the coefficient of thermal expansion between metal member 33 and ceramic tube 35 as temperatures change without transmitting undue stress to either material. Because the material from which the double U-ring sealing element is formed behaves at least in part elastically, even at elevated operating temperatures, the seal can withstand changes in temperature and pressure without loss of seal integrity.

Figure 5:
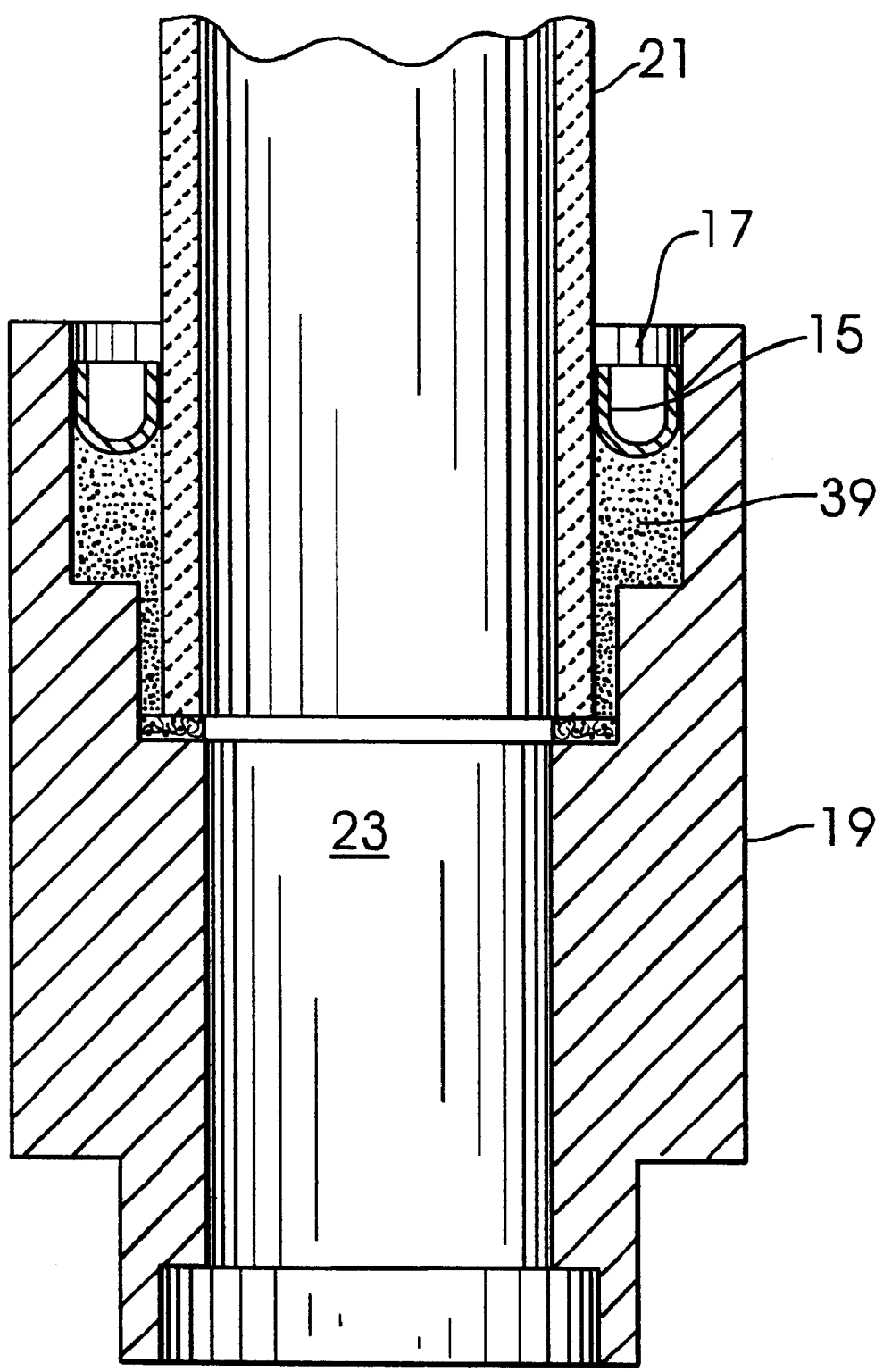
FIG. 5 is a cross section of an alternative seal assembly using the sealing element of FIG. 1.

An alternative seal assembly utilizing the U-shaped toroidal ring of FIG. 1 is illustrated in cross section in FIG. 5, which is a modification of the seal assembly of FIG. 3 described above. Compliant metal U-ring 15 is located in annulus 17 formed between a cylindrical opening in metal member 19 and the outer diameter of ceramic tube 21. U-ring 15 is supported or backed by a bed 39 of material in annulus 17. The material can be in the form of a powder, a fiber, or a combination of a powder and a fiber. The material preferably is a ceramic material. U-ring 15 acts as the primary seal, again utilizing the pressure activation mechanism described earlier. Bed 39 serves as a secondary seal, further improving the sealing performance of the seal assembly limiting the leak rate of any gas which may pass U-ring 15. The powder or fiber bed also provides mechanical support to U-ring 15, thereby decreasing the likelihood of creep failure of the U-ring element. In turn, U-ring 15 transmits the applied pressure to the powder or fiber bed, actively compressing the bed and increasing the gas flow resistance of the bed.

Figure 6A:
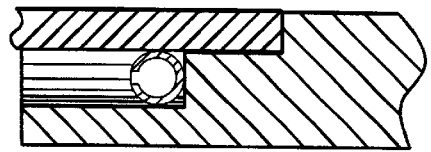
FIGS. 6A through 6H are alternative seal geometries of the present invention.
Figure 6B:
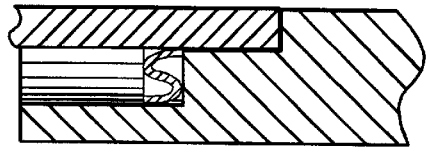
Figure 6C:
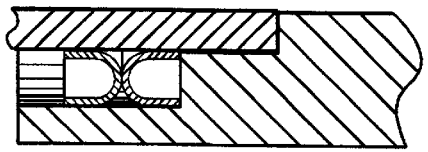
Figure 6D:
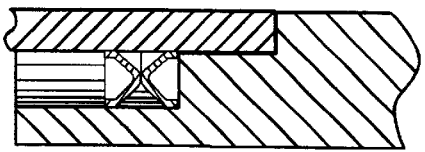
Figure 6E:
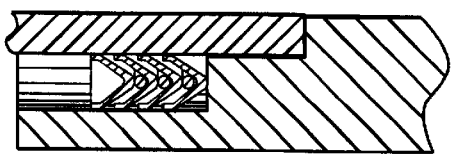
Figure 6F:
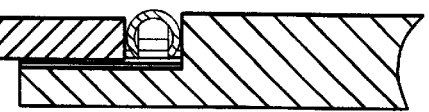
Figure 6G:
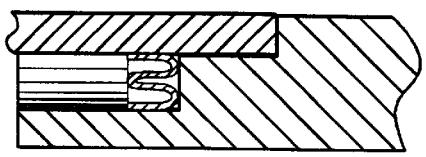
Figure 6H:
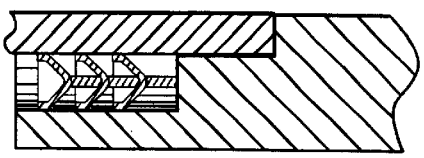

Alternative configurations of the sealing ring are illustrated in FIGS. 6A to 6H. In FIG. 6A, the ring is in the shape of a C wherein the open side is oriented axially as shown. The ring also can be a hollow O-ring with a series of holes open to the annulus as shown. In FIG. 6B, the ring is in the shape of an S oriented horizontally with a circumferential volume oriented toward the annulus as shown. In FIG. 6C, the ring is in the shape of an H having a circumferential volume oriented toward the annulus as shown. In FIG. 6D, the ring is in the shape of an X having a circumferential volume oriented toward the annulus as shown. In FIG. 6E, the sealing member comprises several stacked V-shaped rings separated by solid brings as spacers, wherein the circumferential volumes are oriented toward the annulus as shown. In FIG. 6F, the ring is in the shape of a C wherein the open side is oriented radially in fluid communication with the annulus as shown. FIG. 6G illustrates a ring in the shape of a W having a circumferential volume oriented toward the annulus as shown. FIG. 6H illustrates several Y-shaped rings stacked to form a sealing member wherein the circumferential volumes are oriented toward the annulus as shown. Other configurations of sealing rings can be envisioned having similar characteristics of compliant members which enclose one or more circumferential volumes oriented towards the annulus.

The compliant seal elements described above compensate for differences in thermal expansion characteristics between the ceramic and metallic members to be sealed. An important attribute of the toroidal rings of the present invention is the compliant nature of the rings in providing pressure-activated gas sealing service in annular geometries.

An annulus formed between a ceramic cylinder and a metallic cylinder will undergo different dimensional changes with temperature depending upon the relative coefficients of thermal expansion of the two materials. If the coefficient of thermal expansion of the ceramic is greater than that of the metal in the annular geometry described above, the annular distance will decrease as temperature increases. The compliant seals described above, if properly sized and installed, can compensate for this change by operating in a larger degree of compression as temperature increases and a smaller degree of compression as temperature decreases while maintaining an acceptable seal between a higher pressure gas and a lower pressure gas. Alternatively, if the coefficient of thermal expansion of the ceramic is less than that of the metal, the annular distance will increase as temperature increases. A properly designed compliant seal, when properly compressed during installation in the annulus at ambient temperatures, can expand as the annular distance increases while maintaining an acceptable seal between a higher pressure gas and a lower pressure gas. This characteristic is an important advantage of the seal elements of the present invention.

The compliant seal elements described above can be utilized in high temperature ceramic heat exchangers, fuel cells, gas sensors, and electrochemical reactors producing oxygen or synthesis gas. In many of these applications, multiple ceramic tubes are used in a shell-and-tube configuration within a pressurized shell. Metal tube sheets are used which have multiple holes or openings into which the ceramic tubes are inserted, thereby forming multiple annular spaces which require sealing. The sealing rings of the present invention can be utilized to provide annular sealing when the pressure on the shell side is greater than the pressure on the tube side of the shell-and-tube configuration. The seals compensate for the radial dimensional changes which occur in annular geometries, and also allow for axial dimensional changes in the ceramic tubes by allowing each tube to slide relative to the seal.

In these applications, the higher and lower pressure gases which are segregated by the seal elements described above depend on the specific process carried out in the apparatus which utilizes the seal elements. In the process for recovering oxygen from air in a ceramic mixed conductor membrane system, for example, the gas at higher pressure on the outside of the ceramic tubes is pressurized air or other oxygen-containing gas while the gas at lower pressure on the inside of the ceramic tubes is a high purity oxygen product. In a catalytic membrane reactor in which oxygen permeates a mixed conductor membrane and the permeated oxygen reacts catalytically with light hydrocarbons to produce synthesis gas or hydrocarbon products, the gas at higher pressure on the outside of the ceramic tubes is pressurized hydrocarbon feed gas and reaction products, while the gas at lower pressure on the inside of the ceramic tubes is air or other oxygen-containing gas.

The compliant seal elements of the present invention also can be used for gas inlet or outlet seals for devices which use ceramic components assembled in a planar stack configuration wherein the stack is contained within a pressurized vessel.

The compliant seal elements or toroidal rings of the present invention can be utilized to seal any metallic material to any ceramic material at temperatures typically up to about 1000° C. Pressure differentials across the seal can range up to about 500 psia.

The metallic material can be a single metal or an alloy which has the required properties. An alloy is preferred, and the alloy may comprise elements selected from the group consisting of iron, nickel, chromium, tungsten, molybdenum, and cobalt. Preferred alloys include the commercially-available nickel-containing Inconel 600, Inconel 625, Incoloy 800, and Haynes 230.

The seal elements can be utilized with ceramic components in high temperature ceramic heat exchangers, fuel cells, gas sensors, hot gas filters, and ceramic membrane reactors producing oxygen or synthesis gas. The specific ceramic in the components used in conjunction with the seal elements is not critical to seal element performance, and the invention is not limited to any specific type of ceramic material. When the seals are used in ceramic membrane reactors, a preferred composition for the ceramic material is a mixed conducting multicomponent metallic oxide represented by the formula $Ln_xA'_{x'}A''_{x''}B_yB'_{y'}O_{3-z}$, wherein Ln is an element selected from the f block lanthanides, A' is selected from Group 2, A'' is selected from Groups 1, 2 and 3 and the f block lanthanides, and B,B' are independently selected from the d block transition metals, excluding titanium and chromium, wherein $0 \leq x < 1$, $0 < x' \leq 1$, $0 \leq x'' < 1$, $0 < y < 1.1$, $0 \leq y' < 1.1$, $x+x'+x''=1.0$, $1.1 > y+y' > 1.0$ and z is a number which renders the compound charge neutral.

An alternative ceramic material for components which can be used with the seals of the present invention is a mixed conducting multicomponent metallic oxide represented by the formula $Ln_xA'_{x'}A''_{x''}B_yB'_{y'}B''_{y''}O_{3-z}$, wherein Ln is an element selected from the f block lanthanides, A' is selected from Group 2, A'' is selected from Groups 1, 2 and 3 and the f block lanthanides, and B,B',B'' are independently selected from the d block transition metals, excluding titanium and chromium, wherein $0 \leq x < 1$, $0 < x' \leq 1$, $0 \leq x'' < 1$, $0 < y < 1.1$, $0 \leq y' < 1.1$, $0 < y'' < 1.1$, $x+x'+x''=1.0$, $1.1 > y+y'+y'' > 1.0$ and z is a number which renders the compound charge neutral. The elements stated above are described according to the Periodic Table of the Elements adopted by IUPAC.

An alternative ceramic material for components which can be used with the seals of the present invention is described in PCT International Publication Number WO 99/21649 and has the formula

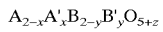

$$A_{2-x}A'_xB_{2-y}B'_yO_{5+z}$$

Where A is an alkaline earth metal ion or mixture of alkaline earth metal ions; A' is a metal ion or mixture of metal ions wherein the metal is selected from the group consisting of metals of the lanthanide series and yttrium; B is a metal ion or mixture of metal ions wherein the metal is selected from the group consisting of 3d transition metals and the group 13 metals; B' is a metal ion or mixture of metal ions wherein the metal is selected from the group consisting of the 3d transition metals, the group 13 metals, the lanthanides, and yttrium; x and y are, independently of each other, numbers greater than or equal to zero and less than or equal to 2; and z is a number which renders the ceramic material charge neutral. The 3d transition metals are known in the art as elements in the series from scandium to zinc. This ceramic material may include a catalyst layer.

Other alternative ceramic materials for components which can be used with the seals of the present invention are described in U.S. Pat. Nos. 5,817,597; 5,591,315; 5,723,074; and 5,639,437.

The above applications describe toroidal rings used with a specific annular geometry in which a ceramic tube resides within a metallic outer member and in which the pressure outside the ceramic tube is greater than the pressure inside the tube. While this is a preferred application, the toroidal rings of the present invention can be used in other configurations. Seal assemblies analogous to those given in FIGS. 3, 4, and 5 can be designed to operate with the higher pressure gas inside the ceramic tube and the lower pressure gas on the outside of the ceramic tube. In this case the direction of the open side of the toroidal ring would be oriented in the opposite direction so that the higher pressure gas would contact the open side of the ring, and the metallic outer member would require a stop or shoulder to support the closed side of the toroidal ring. Alternatively, the outer member can be ceramic and the inner tube can be metallic, and the toroidal ring would be placed in the annulus in a radial orientation such that the open side of the ring would be in contact with the higher pressure gas.

EXAMPLE 1

Metallic U-rings as described in FIG. 1 were formed from thin gauge metal foils (about 0.004 to 0.006 inch thick) using standard metal forming techniques such as stamping and drawing. The metal foils were made of the commercially-available nickel-containing alloys Inconel 600, Incoloy 800, and Haynes 230. After forming and trimming, the rings were coated by plating to a thickness of about 0.0002 to 0.0003 inch. The Inconel 600 rings were coated with silver, and the Incoloy 800 and Haynes 230 were coated with gold. The nominal ring dimensions were as follows: height, 0.1 inch; width, 0.1 inch; and inner diameter, 0.55 inch.

Metallic seal elements or holders as described in FIG. 3 were machined from Incoloy 800 and Haynes 230 alloy bar stock and the inner diameter of each was sized to be about 0.004 inch smaller than the outer diameter of the U-rings. Sufficient depth was allowed in the seal elements for the use of either single or double U-rings of FIGS. 1 or 2.

Ceramic tubes having a nominal diameter of 0.56–0.60 inch and wall thickness of 0.050 to 0.075 inch were fabricated using standard ceramic forming techniques such as isostatic pressing or slip casting followed by sintering to a desired density at elevated temperatures. The end of each ceramic tube to be sealed was machined to a diameter within approximately ±0.0001 inch of the inner diameter of the U-ring in order to allow a close sliding fit of the U-ring onto the ceramic tube during assembly. The tubes were made of a ceramic having the general composition $La_{0.5}Sr_{0.5}Co_{1.02}O_{3-\delta}$, where δ is a parameter which renders the composition charge neutral. The coefficient of thermal expansion for this ceramic varied from $15.1 \times 10^{-6}$ (° C.)$^{-1}$ to $27.0 \times 10^{-6}$ (° C.)$^{-1}$ over a temperature range of room temperature to 900° C.

The components described above were assembled by placing one or two U-rings onto the machined end of the ceramic tube. If two U-rings were used, a spacer was mounted between the rings to prevent direct contact between the rings. The spacer was made of silver. Each ceramic tube with U-rings in place was seated into the metallic seal holder and the U-rings were pressed into place using an arbor press or similar device, thereby compressing the outer diameter of the U-rings and providing the initial seal to the ceramic tube.

The U-rings were oriented toward the high pressure side of the seal assembly to provide pressure activation of the rings.

EXAMPLE 2

Seal assemblies prepared in Example 1 were tested by fabricating a test cell wherein the ceramic tube was inserted into a ceramic to metal seal assembly and was subjected to heating and external pressurization while simultaneously maintaining the interior of the ceramic tube at atmospheric pressure. The free end of the ceramic tube was closed by an alternative means such as brazing a ceramic plate to the tube end. Typically the metal seal holder was attached to a metal support tube, through brazing or welding, such that the interior of the metal support tube was connected through the seal holder to the interior of the ceramic tube. The testing apparatus consisted of an externally heated, metal pressure vessel fitted with gas inlets and outlets and appropriate pressure and temperature control devices. Additionally, the pressure vessel was fitted with appropriate flanges to permit installation of the ceramic tube-seal-support tube assembly into the interior of the pressure vessel while simultaneously connecting the interior of the support tube to a port on the exterior of the pressure vessel. Leakage through the seal was characterized by measuring the flow of gas from the port using gas flow measurement devices such as rotameters or mass flow meters.

Typical seal tests were performed by first heating the seal to desired operation temperature, as indicated by a thermocouple inserted into the interior of the seal, followed by pressurization of the seal exterior to the desired testing pressure. Heating and pressurization were performed either stepwise, involving a series of ramps and holds, or continuously. Typical temperature and pressure ramp rates were 1° C./min and 1 psi/min. During a test, gas flow from the low pressure port, indicating the leak rate of the seal, was monitored. Once the desired operation conditions were achieved, the conditions were maintained for periods up to approximately 1000 hours. Following completion of the test, the test samples were depressurized to atmospheric pressure and then cooled to ambient temperature. Depressurization and cooling were performed either stepwise, involving a series of ramps and holds, or continuously. Typical temperature and pressure ramp rates were 1° C./min and 1 psi/min respectively.

The results obtained from seal tests performed in this apparatus are summarized in Table 1.

TABLE 1

Results of Example 1

| Seal Test Number | Seal Temperature (° C.) | Pressure (psig) | Leakage Rate [sccm (21° C.)] |
| --- | --- | --- | --- |
| 1 | 825 | 25 | 0 |
|   | 825 | 50 | 3.1 |
|   | 825 | 75 | 3.1 |
|   | 825 | 100 | 4.4 |
|   | 825 | 125 | 5.7 |
| 2 | 850 | 25 | 4.4 |
|   | 850 | 50 | 0 |
|   | 850 | 75 | 2.4 |
|   | 850 | 100 | 5.0 |
|   | 850 | 125 | 8.7 |
|   | 850 | 150 | 13.4 |
| 3 | 850 | 25 | 2.0 |
|   | 850 | 50 | 4.\1 |

TABLE 1-continued

Results of Example 1

| Seal Test Number | Seal Temperature (° C.) | Pressure (psig) | Leakage Rate [sccm (21° C.)] |
| --- | --- | --- | --- |
|   | 850 | 75 | 6.5 |
|   | 850 | 100 | 7.7 |
|   | 850 | 125 | 10.6 |

EXAMPLE 3

Seal assemblies prepared in Example 1 were tested by fabricating a test cell wherein a ceramic tube inserted into a ceramic to metal seal assembly can be subjected to heating and external pressurization while simultaneously maintaining the interior of the ceramic tube at subatmospheric pressure. The free end of the ceramic tube was closed by an alternative means such as brazing a ceramic plate to the tube end. Typically the metal seal holder was attached to a metal support tube, through brazing or welding, such that the interior of the metal support tube was connected through the seal holder to the interior of the ceramic tube. The testing apparatus consisted of an externally heated, metal pressure vessel fitted with gas inlets and outlets and using appropriate pressure and temperature control devices. Additionally, the pressure vessel was fitted with appropriate flanges to permit installation of the ceramic tube-seal-support tube assembly into the interior of the pressure vessel while simultaneously connecting the interior of the support tube to a subatmospheric pressure port on the exterior of the pressure vessel. Subatmospheric pressure was maintained in the interior of the ceramic tube-seal-support tube assembly by actively pumping the interior using a vacuum pump and appropriate pressure control valves and overpressurization relief devices. Leakage through the seal was characterized by measuring the flow of gas from the atmospheric pressure outlet of the vacuum pump using gas flow measurement devices such as rotameters or mass flow meters.

Typical seal tests were performed by first evacuating the interior of the ceramic tube-seal-support tube assembly to the desired operating pressure followed by heating the seal to desired operation temperature, as indicated by a thermocouple inserted into the interior of the seal. The exterior of the ceramic tube-seal-support tube assembly was then pressurized to the desired testing pressure. Evacuation, heating and pressurization were performed either stepwise, involving a series of ramps and holds, or continuously. Typical ramp rates were 100 torr hr$^{-1}$, 1° C. min$^{-1}$ and 1 psi min$^{-1}$. During a test, gas flow from the low pressure port, indicating the leak rate of the seal, was monitored. Once the desired operation conditions were achieved, the conditions were maintained for periods up to approximately 3000 hours. Following completion of the test, the test samples were depressurized to atmospheric pressure followed by cooling to ambient temperature. Once ambient conditions were achieved, the pressure in the interior of the ceramic tube-seal-support tube assembly raised to atmospheric pressure. Depressurization and cooling were preformed either stepwise, involving a series of ramps and holds, or continuously. Typical ramp rates were 1° C. min$^{-1}$ and 1 psi min$^{-1}$. The pressure in the interior of the ceramic tube-support tube assembly was raised at a rate of 100 torr hr$^{-1}$. Results obtained from seal tests performed in this apparatus are summarized in Table 2.

TABLE 2

Results for Example 3

| Seal Test Number | Seal Temperature (° C.) | Pressure (psig) | Interior Pressure (torr) | Leakage Rate [sccm (21° C.)] |
|---|---|---|---|---|
| 1 | 850 | 150 | 90 | 18.8 |
| 2 | 825 | 50 | 90 | 10.3 |
|   | 850 | 50 | 90 | 8.9 |
|   | 875 | 50 | 383 | 5.9 |
|   | 875 | 75 | 7.6 | 13.9 |
| 3 | 875 | 25 | 90 | 2.2 |
|   | 875 | 50 | 6.7 | 0.8 |
|   | 875 | 50 | 90 | 0.7 |
|   | 875 | 75 | 184 | 1.5 |
| 4 | 875 | 200 | 500 | 2.4 |

The results of the tests in Examples 2 and 3 indicate that seals of the present invention can seal nominal 0.55 inch diameter ceramic tubes to nickel alloy metal elements at pressures up to 200 psig and temperatures up to 875° C. with absolute seal leak rates ranging form below detectable limits to about 14 sccm (standard cubic centimeters per minute). The allowable maximum seal leak rate is determined by the product purity requirement in the particular process system using the seal. For example, consider a mixed conductor ceramic membrane oxygen recovery unit producing 1 tpd (ton per day) of oxygen in which the unit uses one manifold seal of the type tested at the conditions of Example 3. If the minimum product purity for the unit is 99.5 vol % $O_2$, then a total allowable system leak rate would be about 2800 sccm. If it is assumed that 10% of the total system leakage is contributed by the manifold seal, then the maximum allowable manifold seal leak rate would be 280 sccm. The seals tested in Example 3 would meet this requirement. Similarly, if the minimum product purity is 99.995 vol % $O_2$ (50 ppmv impurity), then the maximum allowable manifold seal leak rate would be about 2.8 sccm, and only some of the seals of Example 3 would meet this requirement. However, if it were assumed that most or all of the total system leak rate occurs at the seal, then all seals tested in Example 3 would be satisfactory in this service.

Thus the present invention provides sealing elements and methods for use in process systems requiring high temperature ceramic-to-metal seals. The invention utilizes one or more compliant metallic sealing rings or sealing elements in which the applied differential pressure across the seal serves to activate the seal and promote acceptable sealing at elevated process temperatures and pressures. The compliant nature of the sealing element allows for differences in thermal expansion between the materials to be sealed. The performance of the sealing element may be improved by coating the metallic sealing element with a soft or flowable metal coating such as silver or gold and/or by backing the sealing element with a bed of fine powder. The metallic material of the sealing element is chosen such that the element responds to stress at least in part elastically, even at elevated temperatures, permitting the seal to perform proper sealing and gas segregation through multiple thermal cycles.

The sealing elements can be utilized in high temperature ceramic heat exchangers, fuel cells, and gas sensors, and have particular utility in membrane reactor systems which utilize ceramic mixed conductor membranes to produce oxygen, synthesis gas, or converted hydrocarbon products. The sealing elements can be utilized at high operating temperatures without requiring cooling of the seals.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A seal element which comprises a metallic toroidal ring having an axial cross section which defines a planar figure, wherein the planar figure partially encloses an area having an open side and a closed side, and wherein the toroidal ring has a ring width and a metal thickness such that the ratio of the ring width to the metal thickness is greater than about 15.

2. The seal of claim 1 wherein the toroidal ring comprises a metallic material coated at least in part with a metallic coating.

3. The seal of claim 2 wherein the metallic material comprises one or more elements selected from the group consisting of iron, nickel, chromium, tungsten, molybdenum, and cobalt.

4. The seal of claim 2 wherein the metallic coating comprises one or more elements selected from the group consisting of gold, copper, nickel, palladium, and platinum.

5. The seal of claim 1 wherein the toroidal ring comprises inner and outer members which partially enclose a circumferential volume having an open side and a closed side, wherein the open side is oriented in a generally axial direction relative to the toroidal ring.

6. The seal of claim 1 wherein the open side of the planar figure is oriented in a generally axial direction relative to the toroidal ring.

7. A seal assembly comprising:
   (a) a metallic member having a cylindrical opening formed therein;
   (b) a ceramic tube located coaxially within the cylindrical opening and forming an annulus between the metallic member and the ceramic tube; and
   (c) a seal located in the annulus and in contact with the metallic member and the ceramic tube, wherein the seal comprises a toroidal ring having an axial cross section which defines a planar figure, wherein the planar figure partially encloses an area having an open side and a closed side, and wherein the toroidal ring comprises a metallic material.

8. The seal assembly of claim 7 wherein the metallic material of the toroidal ring comprises one or more elements selected from the group consisting of iron, nickel, chromium, tungsten, molybdenum, and cobalt.

9. The seal assembly of claim 8 wherein the metallic material of the toroidal ring is coated at least in part with a metallic coating which comprises one or more elements selected from the group consisting of silver, gold, copper, nickel, palladium, and platinum.

10. The seal assembly of claim 7 wherein the toroidal ring has a ring width and a metal thickness such that the ratio of the ring width to the metal thickness is greater than about 15.

11. The seal assembly of claim 7 wherein the open side of the planar figure is oriented in a generally axial direction relative to the toroidal ring.

12. A method for sealing a metallic member and a ceramic member which comprises:
   (a) providing an annulus between the metallic member and a cylindrical ceramic member;
   (b) placing a seal in the annulus wherein the seal comprises a metallic toroidal ring having an axial cross section which defines a planar figure, wherein
      the planar figure partially encloses an area having an open side and a closed side, the toroidal ring comprises inner and outer members which partially enclose a circumferential volume having an open side and a closed side; and (c) maintaining a first gas at a first pressure in an annular volume defined by a first portion of the annulus and the open side of the circumferential volume of the toroidal ring.

13. The method of claim 12 wherein the open side of the planar figure is oriented in a generally axial direction relative to the toroidal ring.

14. The method of claim 12 wherein the open side and the closed side of the circumferential volume are oriented in generally opposite axial directions relative to the toroidal ring.

15. The method of claim 12 wherein the toroidal ring is coated at least in part with a metallic coating.

16. The method of claim 15 wherein the metallic coating comprises one or more elements selected from the group consisting of silver, gold, copper, nickel, palladium, and platinum.

17. The method of claim 12 which further comprises maintaining gas at a second pressure in an annular volume defined by a second portion of the annulus and the closed side of the circumferential volume of the toroidal ring, wherein the second pressure is less than the first pressure, and wherein the differential pressure between the first gas and the second gas urges the inner and outer members of the toroidal ring against the cylindrical ceramic member and the metallic member respectively to effect a pressure-activated seal.

18. The method of claim 17 wherein the first gas is an oxygen-containing gas and the second gas is an oxygen-containing gas having a higher oxygen concentration than the first gas.

19. The method of claim 17 wherein the first gas comprises one or more components selected from the group consisting of methane, hydrogen, carbon monoxide, and carbon dioxide, and the second gas is an oxygen-containing gas.

20. The method of claim 12 wherein the metallic toroidal ring comprises one or more elements selected from the group consisting of iron, nickel, chromium, tungsten, molybdenum, and cobalt.

21. The method of claim 12 wherein the planar figure formed by the axial cross section is described by a general shape selected from the group consisting of C, H, S, U, V, W, X, and Y.

22. The method of claim 21 wherein the closed lower side of the circumferential volume of the toroidal ring is supported by a contiguous material contained in the annulus, wherein the contiguous material is a powder, a fiber, or a mixture of a powder and a fiber.

23. The method of claim 21 wherein the planar figure formed by the axial cross section of the toroidal ring is U-shaped, thereby forming a U-shaped toroidal ring having an open side and a closed side, and wherein the toroidal ring has a ring width and a metal thickness such that the ratio of the ring width to the metal thickness is greater than about 15.

24. The method of claim 23 wherein the closed lower side of the circumferential volume of the toroidal ring is supported by a contiguous material contained in the annulus, wherein the contiguous material is a powder, a fiber, or a mixture of a powder and a fiber.

25. The method of claim 23 wherein the seal further comprises an additional U-shaped toroidal ring, wherein the additional U-shaped toroidal ring comprises a metallic material coated at least in part with a metallic coating.

26. The method of claim 25 wherein the U-shaped toroidal ring and the additional U-shaped toroidal ring are situated adjacently in the annulus, wherein the open side of each U-shaped toroidal ring is oriented in the same axial direction.

27. The method of claim 25 wherein a spacer is placed between the closed side of the U-shaped toroidal ring and the open side of the additional U-shaped toroidal ring.

28. The method of claim 12 wherein the metallic member has a cylindrical opening therein and the cylindrical ceramic member comprises a ceramic tube, and wherein the annulus is defined by placement of the ceramic tube coaxially within the cylindrical opening in the metallic member.

29. The method of claim 28 wherein the metallic member comprises one or more elements selected from the group consisting of iron, nickel, chromium, tungsten, molybdenum, and cobalt.

30. The method of claim 12 wherein the metallic member, the cylindrical ceramic member, and the toroidal ring are maintained at temperatures between about 400° C. and about 1000° C.

* * * * *